(12) United States Patent
Miklitarian

(10) Patent No.: US 6,513,927 B2
(45) Date of Patent: Feb. 4, 2003

(54) PREADJUSTED EYEGLASS FRAMES

(75) Inventor: Alain Miklitarian, Paris (FR)

(73) Assignee: Mikli Diffusion France S.A., Paris (FR)

( * ) Notice: Subject to any disclaimer, the term of this patent is extended or adjusted under 35 U.S.C. 154(b) by 0 days.

(21) Appl. No.: 09/999,770

(22) Filed: Oct. 19, 2001

(65) Prior Publication Data

US 2002/0089641 A1 Jul. 11, 2002

Related U.S. Application Data

(60) Provisional application No. 60/241,681, filed on Oct. 19, 2000.

(51) Int. Cl.[7] .................................................. G02C 5/14

(52) U.S. Cl. .......................... 351/111; 351/114; 351/41

(58) Field of Search ........................ 351/41, 111, 113, 351/114, 123

(56) References Cited

U.S. PATENT DOCUMENTS

| 3,475,083 A | * | 10/1969 | Gitlin et al. | ................. 351/111 |
| 5,583,586 A | | 12/1996 | Evans | ......................... 351/130 |
| 5,594,511 A | * | 1/1997 | Lin | ............................. 351/116 |
| 5,627,609 A | | 5/1997 | Kato | .......................... 351/123 |
| 6,102,542 A | | 8/2000 | Masuda | ...................... 351/110 |

FOREIGN PATENT DOCUMENTS

| FR | 2 562 274 | * | 10/1985 | ................. 351/41 |
| GB | 524366 | * | 8/1940 | ................. 351/123 |

* cited by examiner

*Primary Examiner*—Huy Mai
(74) *Attorney, Agent, or Firm*—Norris, McLaughlin & Marcus, P.A.

(57) ABSTRACT

An eyeglass frame having temple extensions each of which form an angle of at least 91 degrees with the front frame when in the fully opened position. The temple extensions have a curved shape and include a shaped spatula at their distal ends to provide that the eyeglass frame engages a user's head more securely and comfortably.

7 Claims, 3 Drawing Sheets

PREADJUSTED EYEGLASS FRAMES

FIELD OF THE INVENTION

The present invention relates to a eyeglass frames, and more particularly, an eyeglass frame having temple extensions including arcuately shaped portions that provide improved fit and comfort to a user.

BACKGROUND OF THE INVENTION

For maximum comfort and the best fit, an optician must adjust eyeglass frames for each individual user. The frame is adjusted to match the shape of the face and the head of the individual. However, traditional frames are usually not adapted to the shape and contours of the head, since there is so much variety in the size and shape of heads. They follow necessarily and roughly, the general shape of the head. Thus, the fit of the eyeglass frame on a user's head is typically too tight or too loose. A frame that is too tight usually results in discomfort and pain to the user, while a loose fitting frame usually results in the frame freely moving about the user's head and possibly falling off the user.

To aid in securing the eyeglass to the user's head, the temple has been designed to have a curved portion at its distal end to secure the frame to the ear and thus the head. However, previous attempts at construction of the temple show a temple that is generally straight and narrow at its distal end causing discomfort and irritation to users due to the pressure applied in such a small area around the ear.

The prior art discloses various attempts to resolve this problem of discomfort and fit. For example, U.S. Pat. No. 5,583,586 discloses eyeglass frames with mounting frontal supports and telescoping temples. However, the frontal supports can be cumbersome and uncomfortable on the face. In addition, the telescoping temples do not necessarily resolve the above aforementioned problem of negotiating the shape of the human head. U.S. Pat. No. 5,627,609 teaches a temple for an eyeglass frame, where the temple secures itself behind the ear. However, the temple may still not conform to the shape of the head, but rather it may rub against the head or not at all, thereby creating either an overly tight or loose fit. A temple with an integrated ear piece is disclosed in U.S. Pat. No. 5,610,669. The temple suffers the same problems as the aforementioned references. While it does wrap around the ear, the temple still fails to address the variety of shapes of the head.

The present invention overcomes the prior art by providing a temple pre-adjustment that allows the temple to conform perfectly to the contours of the human head. The inventor has found that vastly improved fit and comfort can be achieved by focusing on a particular volume and curve of the temples, as set forth herein.

SUMMARY OF THE INVENTION

Accordingly, the present invention provides for an eyeglass frame, preferably made of plastic or other suitable material, including a front frame and a pair of temple extensions. Each temple extension has a front portion, a middle portion arcuately curved inwardly toward the head, a rear portion also arcuately curved inwardly toward the region of the head, and a spatula. The front portion of each extension is hinged to the front frame to form an angle which is preferably greater than 90 degrees with the front frame when the temple extension is in the fully opened position. The middle portion of each extension has a smaller cross-sectional dimension than its corresponding front and rear portions. The spatula has a bulbous, rounded shape.

Each of the temple extensions has a medial, or inner plane, and a lateral, or outer plane. In the middle portion of the temple, the medial plane is substantially more curved (i.e. has a smaller radius of curvature) than the corresponding lateral plane, thereby resulting in the smaller cross-sectional dimension. The smaller cross-sectional dimension provides each of the temple extensions with the required elasticity and springiness to respond and conform to the shape of an individual's head.

In a preferred embodiment, the spatula includes a flat surface portion which would face the head and extends arcuately away from the direction of curvature of the adjacent rear portion. Therefore, in use of the eyeglass frame, the surface portion of the spatula is spaced from the head, thereby resulting in improved comfort and a substantial reduction in irritation to the head.

It is a general objective of the invention to provide an improved eyeglass frame that better conforms to the shape of a user's head and is comfortable to wear on the head for a substantial period of time.

These and other objects of the invention are best understood and more apparent when the detailed description and the accompanying drawings are read in conjunction with each other.

DETAILED DESCRIPTION OF THE PREFERRED EMBODIMENTS

Figure 1:
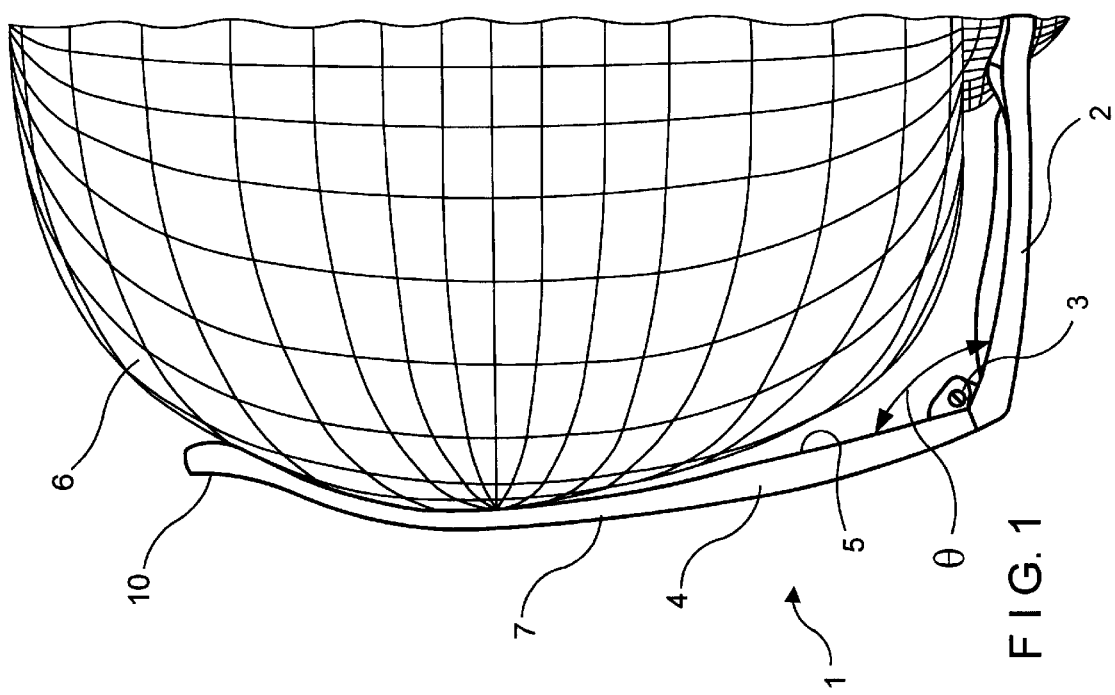
FIG. 1 is a top plan view of the eyeglass frame of the invention as worn on the head of an individual.

FIG. 1 shows an eyeglass frame 1 in accordance with the present invention as it would be worn on a head 6 of a user. Referring to FIG. 1, the frame 1 includes a front frame 2, a temple extension 4 and a spatula 10. The front frame 2 and the temple 4 are coupled together and secured by a hinge mechanism 3. The temple 4 and the spatula 10 preferably are of unitary construction. The eyeglass frame 1 preferably is constructed of a suitable and substantially light rigid material such as molded plastic, or other suitable materials. It is understood that a second temple is situated on the opposite side of the front frame 2, opposing the temple 4 (shown in FIG. 1), and coupled in the same fashion to the front frame 2 as the temple 4.

Figure 5:
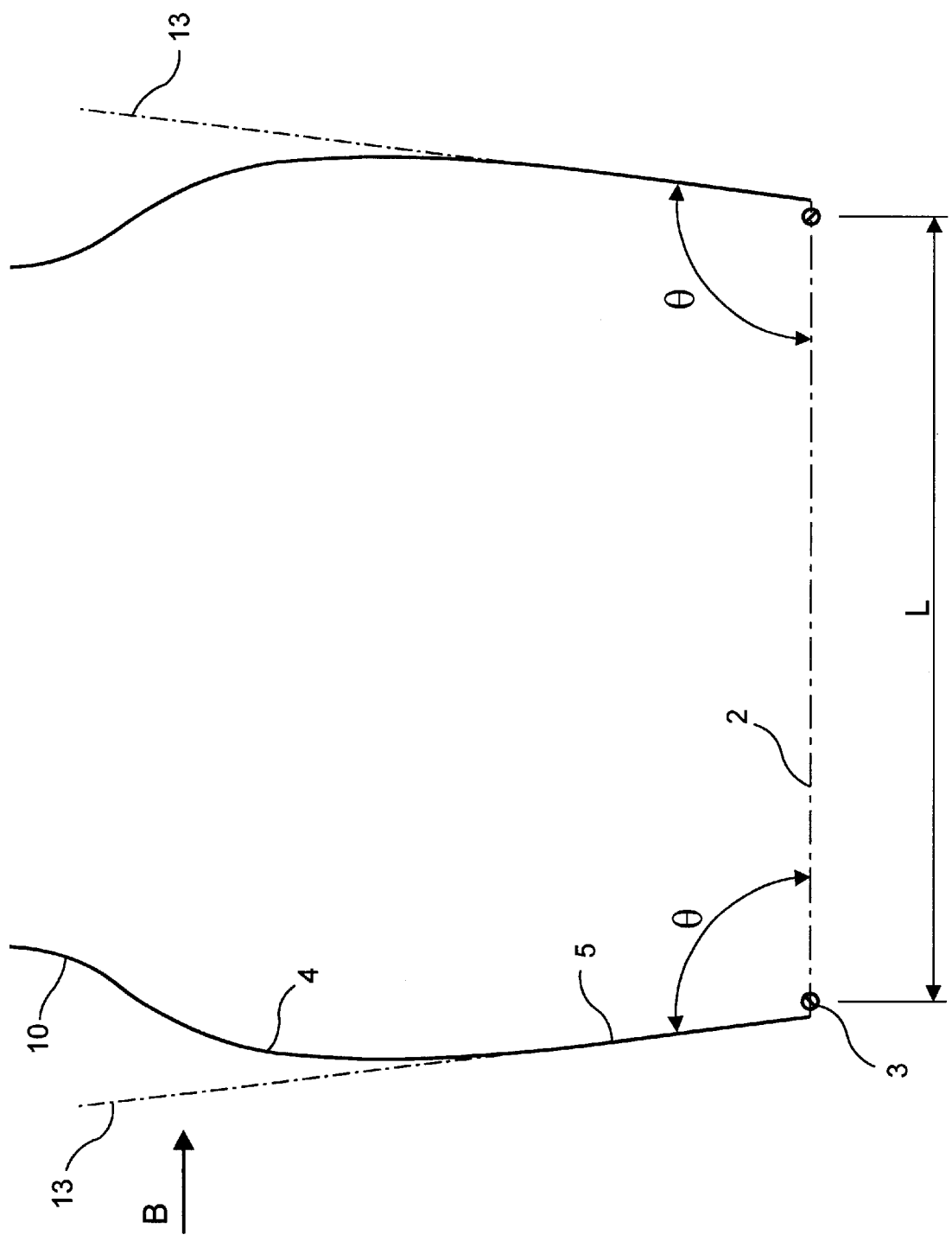
FIG. 5 is a top, schematic view of the eyeglass frame.

Referring to FIG. 5, the front frame 2 has a length L. A medial plane 5 of the temple 4 forms an angle θ, which is preferably greater than 90°, with the front frame 2 when the temple 4 is in a fully opened position, rotated away from the front frame 2. In a preferred embodiment, there is an inverse relationship between the length L of the front frame 2 and the angle θ. The angle θ decreases as L increases, but, preferably, θ always remains greater than 90°. The angle θ, preferably, is greater than 90° and up to about 97°, depending upon the particular length L selected for the front frame 2. Non-limiting examples of suitable angles θ and respective lengths L are the following: about 91° and about 135 mm; about 93° and about 130 mm; about 95° and about 125 mm; and about 97° and about 120 mm.

Figure 3:
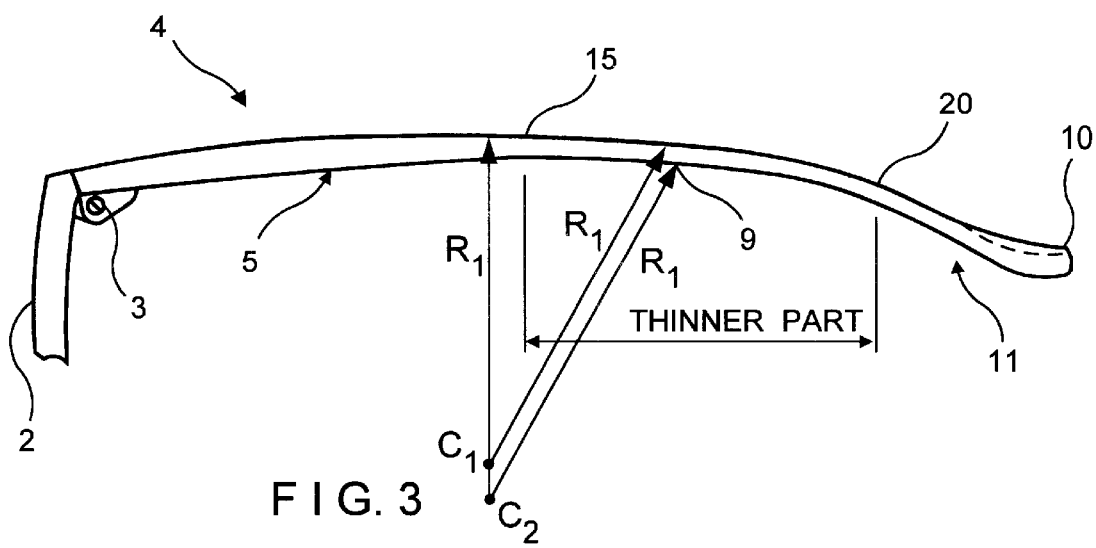
FIG. 3 is a top plan view of a temple attached to the front frame.
Figure 6:
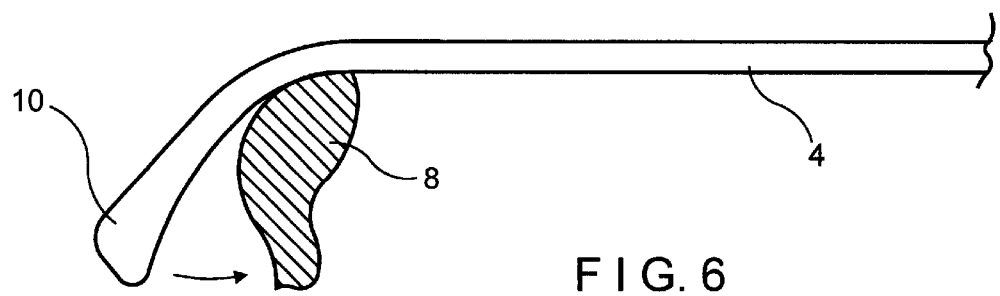
FIG. 6 is a side plan view showing the temple and spatula positioned with respect to the ear of an individual.

Referring to FIGS. 1 and 3, the temple 4 extends distally from the front frame 2 and terminates at the spatula 10. In addition, the cross-sectional dimension of the temple 4 changes along its length from the front frame 2 to the spatula 10. The shape of the temple 4 is not straight, as in the standard, prior art frame. The inventive temple 4 is curved to better conform to the shape and contours of the head 6, including the temple region and the ear region 8 of the user's head 6 as shown in FIG. 6. The temple 4 is constructed with a suitable curved shape such that, when the eyeglass frame 1 is in use upon the head 6, the eyeglass frame 1 is secured to the head 6.

Referring to FIG. 5, the medial plane 5 of the temple 4 initially extends distally and straight, parallel to the head 6, and following an axis 13, which is extrapolated from the temple 4 based on a selected angle θ. Referring to FIG. 3, at a point 15 on the medial plane 5 which is distally displaced a predetermined distance on the temple 4, the medial plane 5 continues to extend distally and arcuately curves inwardly toward the head 6 to better adapt to the contours of the head. In a preferred embodiment, the medial plane 5 extends along the contour and shape of the head 6, until reaching the spatula 10. The spatula 10 is curved and extends arcuately away from the head 6 and in a direction opposite to the curvature of the adjacent medial plane 5.

Referring again to FIG. 3, the temple 4 includes a lateral plane 7 which generally follows the line of the medial plane 5. The lateral plane 7 extends distally from the front frame 2, and generally has the shape of a gently and continuously curving arc. The radius R1 of the arc will generally increase with an increase in L. The proximal portion of the medial plane follows generally a straight line, so that in a preferred embodiment, the width of the proximal portion of the temple increases and then decreases. It is noted above that the proximal portion of the lateral plane preferably follows a continuous curve. This provides an aesthetic impression of a smooth curving line from an outside view. However, to achieve the effect of the invention, the proximal portion of the lateral plane may be generally straight and substantially parallel to the proximal medial plane.

The mid-point 9 of the temple defines a change in shape, and marks the transition from the proximal to the distal portion of the temple. The distal portion has an overall narrower width than the promixal portion, with an exemplary, but not non-limiting dimension being about 2.5 mm. From the mid-point 9, both the lateral and medial planes are preferably following parallel paths, so that the width of the distal portion is generally uniform. At point 9, the medial plane may take on the radius of curvature R1, though with respect to a center point C2 that is situated inwardly from the center C1 corresponding to the center of curvature for the lateral plane, but a distance equal to the width of the distal portion. The distal portion, by virtue of its narrower dimension starting at mid-point 9, thus allows for a means of adjusting the fit of the temple to the individual. The temple has a springiness at point 9 which allows for a comfortable fit, but also allows for a degree of shape-retaining bend of the temple at that point for a custom fit.

It should be noted that the distal portion need not be characterized by a consistent radius of curvature. In fact, a preferred shape is one which generally conforms to the outer profile of the head, as shown in FIG. 1.

The narrower distal region ends at point 15, and the temple again changes shape toward the spatula 10. The medial plane in the spatula region, i.e. distal of point 20, may continue to follow the outline of the shape of the head, for example by continuing with radius of curvature R1, while eventually sweeping away from the head towards the end of spatula 11 to insure comfort. The lateral plane of spatula region preferably begins to tail away from the head from point 20, thus increasing the thickness of the spatula region towards the bulbous spatula.

Figure 2:
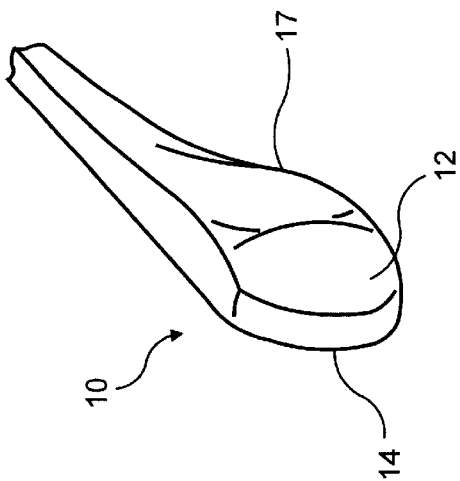
FIG. 2 is a perspective view of the spatula of a temple.
Figures 4A, 4B, 4C:
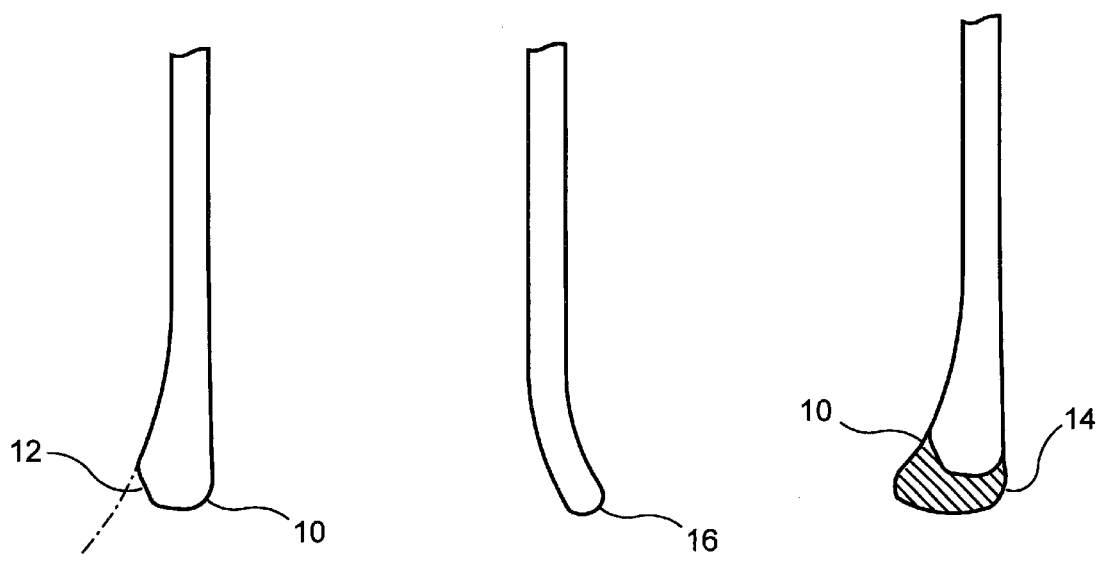
FIG. 4A is a top plan view of a rear portion of a temple, including the spatula.
FIG. 4B is a top plan view of a rear portion of a temple of the prior art.
FIG. 4C is a top plan view of a rear portion of a temple prior to performance of the step for manufacture of the spatula.

The shape of the spatula 10 is selected to provide improved comfort to the user. FIG. 4B shows a prior art spatula without any additional 'volume', while the spatula of FIG. 4A represents the inventive design, having a bulbous, generally rounded end of increased volume and cross-sectional dimension. FIG. 4C shows the distal end 14 of a temple including a predetermined amount of plastic or other suitable material which is to be removed for manufacture of the spatula 10. The material at the distal end 14 is suitably sculpted to take the shape of the spatula 10 as shown in FIG. 4A. Referring to FIG. 6, the shape and volume of the spatula 10 provides that the temple 4 is in a preferred position when adjacent to the ear 8. In a preferred embodiment, referring to FIG. 2, a surface portion 12 of the spatula 10, adjacent to both an inside face 17 of the spatula and the distal end 14, is finished to form a generally flat face, which preferably is smooth. The surface portion 12 is at an angle with respect to the inside face 17. The face portion 12 is, thus, suitably angled away from the head 6 such that a smooth surface is visible and the spatula portion of the temple 4 does not irritate the head 6 when the eyeglass frame 1 is worn, thereby substantially reducing pain as often occurred with prior art eyeglass frames when worn for a long period of time.

Although preferred embodiments of the present invention have been described and illustrated, it will be apparent to those skilled in the art that various modifications may be made without departing from the principles of the invention.

What is a claimed is:

1. An eyeglass frame comprising:

a front frame; and a pair of temple extensions hinged to the front frame so as to have an angle greater than 90 degrees with respect to the frame when in an open position, each temple extension being defined by an inner, medial plane, and an outer, lateral plane, and by a proximal portion in a region adjacent the frame, and a distal portion, a transition between the proximal and distal portions being defined by a mid-point, and a width of the temple extension being defined as a distance between the medial and lateral planes, the distal portion having a width which is less than that of the proximal portion, at least in a region adjacent the mid-point, so as to provide elasticity and the ability to bend about the mid-point.

2. The eyeglass frame of claim 1, wherein the lateral plane has the form of a generally continuous, gently curving arc.

3. The eyeglass frame of claim 2, wherein the proximal medial plane has the form of a generally straight line.

4. The eyeglass frame of claim 2, wherein the distal medial plane runs generally in parallel to the distal lateral plane to form a region of substantially uniform width.

5. The eyeglass frame of claim 1, wherein the distal medial plane follows a path substantially defined by an adjacent profile of a human head when the frames are worn upon the head.

6. The eyeglass frame according to claim 1, wherein a spatula region is located distally from a distal end of the distal portion of the temple extension, the temple extension terminating in the form of a spatula having a bulbous, rounded shape.

7. The eyeglass frame according to claim 6, wherein the medial plane follows the radius of curvature from the distal portion into the region adjacent the spatula, and then curves in reverse direction toward the spatula.

* * * * *